Oct. 21, 1969    KARL-HEINZ STEIGERWALD ET AL    3,474,219
MACHINING PROCESS USING RADIANT ENERGY
Filed March 24, 1966      2 Sheets—Sheet 1
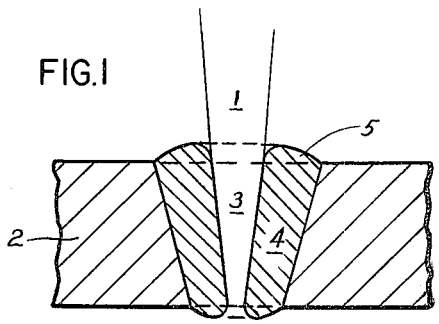
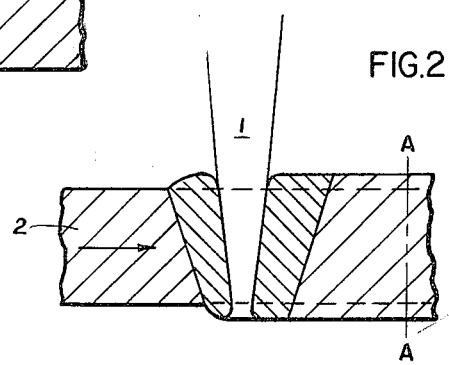
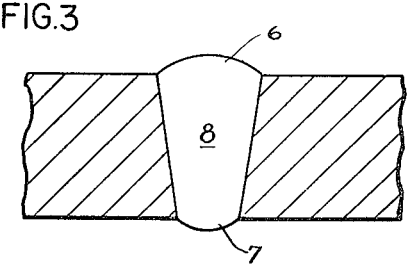
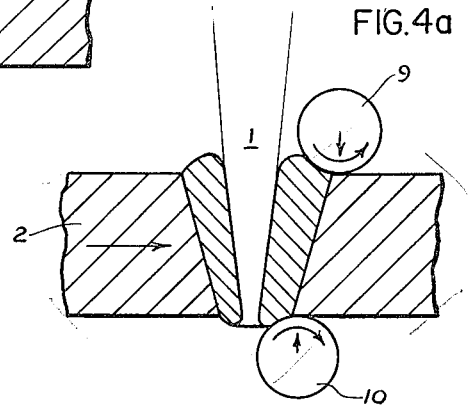
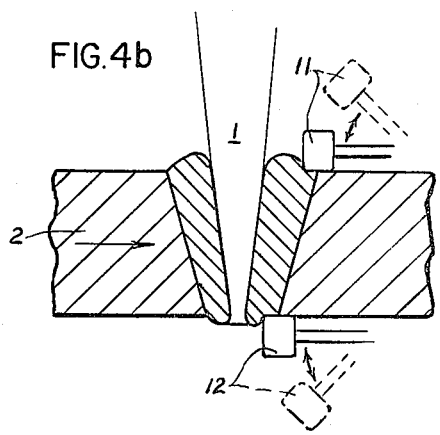
KARL-HEINZ STEIGERWALD
EDGAR MEYER
ATTORNEYS

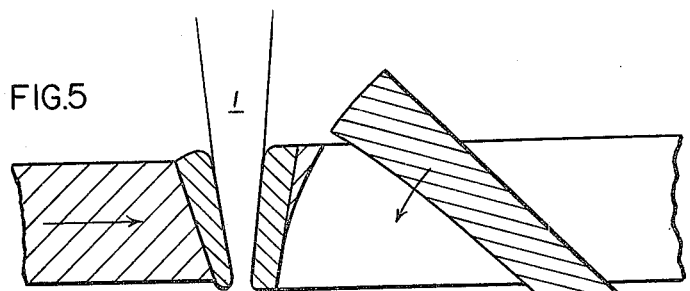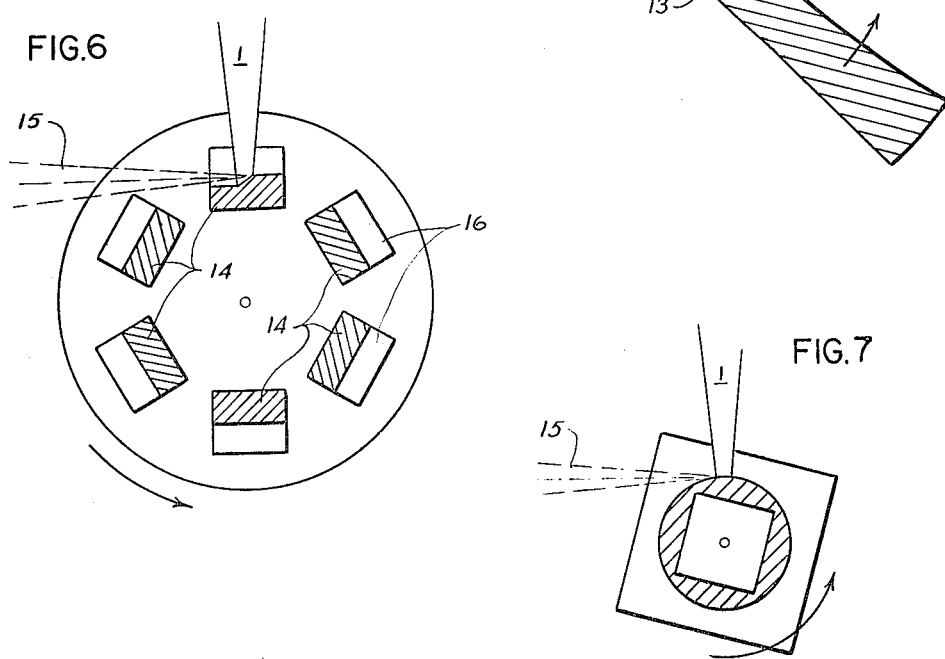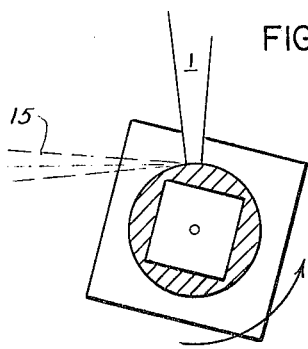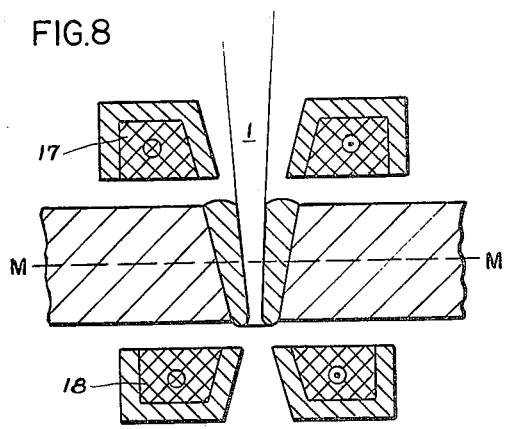

United States Patent Office 3,474,219
Patented Oct. 21, 1969

3,474,219
MACHINING PROCESS USING
RADIANT ENERGY
Karl-Heinz Steigerwald, Lochham, and Edgar Meyer,
Gilching, Germany, assignors to K. H. Steigerwald
G.m.b.H.
Filed Mar. 24, 1966, Ser. No. 537,146
Claims priority, application Germany, Mar. 30, 1965,
St 23,591
Int. Cl. B23k 9/16, 9/02
U.S. Cl. 219—121                           3 Claims

ABSTRACT OF THE DISCLOSURE

A process is described wherein a beam of radiant energy is used to work a material in cooperation with a mechanical or magnetic force applied to the workpiece in the vicinity of the beam to either compress previously melted and still hot and soft material back into the seam between the workpieces or eject previously melted material to form a well controlled cut. Several embodiments are shown wherein the workpiece may be subjected to vibratory compressive force by the application of hammers or may be subjected to a high speed rotation while being acted upon by the beam to force ejection of workpiece material by a centrifugal force.

---

Extremely high power densities can be achieved with the aid of bundled rays such as corpuscular rays or electromagnetic rays. It is known that such beams can be used as technical sources of heat. With their aid, practically all known types of machining and material treatment can be performed, for example drilling, cutting, cutting-off, annealing, hardening, soldering, welding, hard facing, sintering, etc. The effect required for carrying out the desired machining process is achieved by exposing a certain zone of the workpiece to a suitably controlled beam of appropriate configuration. The absorption of the radiant energy by the material leads to an intensive heating of the zones struck by the beam. Thus a material-removing effect, deep-penetration welding and similar effects are, for example, caused by a certain variation of temperature with regard to location and time. The limits of the process are given by the type and characteristics of the radiation employed. Thus, for instance, if it is desired to remove material, this is attempted by heating up the corresponding workpiece zone until the material is vaporized. This is generally favored by the fact that the radiant energy is absorbed by thin surface layers of the workpiece so that these zones are rapidly heated to high temperatures due to the given high power density. The radiation can reach deeper zones only after the overlying layers have been removed by the effects of vaporization. Leaving apart the energy required for complete vaporization, the material-removing effect is limited by the available power density.

In welding, deeper layers can be reached directly only with the aid of the deep-penetration effect. This is likewise possible only if the power and power density of the radiation used reach values at which the material is heated beyond the melting point to sufficiently high temperatures. These must lead to vapor pressures capable of opening a capillary in the molten material allowing the beam to pass through it and reach deeper layers.

The processes described above are essentially determined by the fact that while the radiation generally produces an intensive heating effect it does not practically exert any mechanical force on the material. This circumstance offers considerable advantages, but it also entails grave disadvantages.

As an example, mention may be made of the operation of a plasma-spray jet. Here a highly heated gas flowing with high speed is used as a source of heat. The plasma jet exerts both a strong heating effect and a strong mechanical force on the material. This makes it particularly suitable for gas cutting techniques in which the material is molten and removed from the seam by the pressure of the gas jet. On the other hand, it is extremely difficult to use this method for welding owing to the pressure exerted on the liquid material.

It follows from this example that the radiation technique is better suited for welding than for cutting, because the radiation exerts practically no pressure on the molten material.

But even the welding techniques employing radiant energy present certain problems due to the fact that a mechanical effect can be exerted on the molten material only indirectly by the vapor pressure. Thus, for instance, the power density required for deep-penetration welding is not needed for the welding process proper and may, under certain conditions, even be harmful. It is only needed to achieve the vapor pressure required to permit the beam to penetrate into the deeper layers of the material.

The subject of the present invention is a method for eliminating the aforementioned limitations of the radiation technique, thus increasing its economy and considerably enlarging its field of application.

According to the invention, forces acting directly on the material exposed to radiation are produced by additional means at least in the workpiece zone struck by the radiation. The most important result of this is that the energy supplied by the radiation need only serve for heating, while the forces acting simultaneously take care of removing, displacing or keeping the material together in the desired manner. Since the radiant energy itself exerts only a negligible pressure on the material, we thus have a machining method in which the thermal and mechanical effects can be produced and controlled by independent processes. This characteristic is a novelty and of fundamental importance for machining methods using radiant energy. In the following, the invention is explained with the aid of a few examples illustrated in the drawings.

FIG. 1 is a schematic sectional view illustrating conventional conditions in a workpiece impinged by a penetrating beam;

FIG. 2 is a schematic view along a seam produced in conventional manner by relative movement between a beam and a workpiece;

FIG. 3 is a schematic sectional view along line A—A of FIG. 2;

FIG. 4a illustrates, in a schematic sectional view similar to FIG. 2, the application of mechanical forces by means of rollers;

FIG. 4b illustrates, in a schematic sectional view similar to FIG. 2, the application of mechanical forces by means of hammers;

FIG. 5 illustrates, in a schematic sectional view similar to FIG. 2, the application of mechanical forces by means of a rotary knife;

FIG. 6 is a schematic top plan view of a rotating table carrying a plurality of workpieces worked by a beam;

FIG. 7 is a schematic top plan view of a rotating workpiece machined by a beam; and FIG. 8 is a schematic sectional view showing a beam acting on a workpiece, and an electromagnetic device for producing a magnetic field at the beam impingement area.

For better understanding, the usual interrelationship between a beam and the material struck is explained first. FIG. 1 shows how the beam 1 incident from above on the workpiece 2 penetrate more or less deeply into the molten material 4 through a capillary 3 formed in the center of irradiation by the vapor pressure, provided that said beam has sufficient power and power density. The material expelled from the capillary forms a bulge 5 at the surface of the workpiece.

If according to FIG. 2 the workpiece 2 is displaced at right angles to the beam 1 (e.g. to the right in the direction of the arrow), then the material entering the area struck by the beam on the left is moved to the right by vaporization or capillary flow, cools down and solidifies at a certain distance from the beam. These processes are independent of whether in the plane of the drawing a joint between two workpieces is moved through the beam for the purpose of welding or whether a solid plate is displaced under the beam so that only a blind seam is produced without any further means. Since only a fraction, if any of the material forming the bulge 5 in FIG. 1 returns to the solidifying melt, a weld cross section with the exaggerated beads 6 and 7 shown in FIG. 3 remains in the plane AA. The material showing the beads is missing in the solidefied cross section 8, a fact which is evidenced by the transverse contraction of the seam. Although this transverse contraction is considerably less than in other welding techniques, it is still troublesome in all those cases where finished parts have to be welded to gage.

In the following, a few embodiments of the invention are explained.

MECHANICALLY PRODUCED ADDITIONAL FORCES

Welding applications

The aforementioned transverse contraction can be suppressed in accordance with the invention as shown in FIG. 4a by arranging the pressure rollers 9 and 10 at an appropriate distance from the beam 1, which press the still liquid, pasty or at least plastically workable material back between the surfaces to be welded. As indicated in FIG. 4b, the same effect can be achieved by rapidly moving hammers 11 and 12.

CUTTING APPLICATIONS

Exertion of force by means of mechanical tools

If material is to be removed (cutting, cutting-off), this can be achieved with the beam alone only by complete vaporization or removal of the molten material by means of high vapor pressure produced in the capillary by superheating. According to the invention it is possible, for instance for cutting a plate as shown in FIG. 5, to melt the material as for producing a blind seam and to remove the still sufficiently hot and thus sufficiently soft material with the aid of a tool, for example a rotary knife or a percussion tool 13, at an appropriate distance from the beam. The good forming properites or low strength of the material to be removed permit rapid advance and thus rational cutting.

EFFECT OF INERTIAL FORCES

If the workpiece is of appropriate shape (especially when it has symmetry of rotation) material can be removed according to the inveniton by rotating the workpiece rapidly and heating the material to be removed to melting temperature by means of the beam. The molten material is then flung away from the workpiece by centrifugal force.

If it is desired to cut solid pieces 14 apart, these will be arranged off the axis of rotation, as shown in FIG. 6, because on the axis of rotation the centrifugal force is zero. The beam 1 then strikes the workpieces successively, melts them at the impact point and is thus capable of deepening the joints 16 due to the removal of the molten material 15 by centrifugal force until the workpieces 14 are completely cut apart.

For cutting off hollow bodies, the axis of the mould may coincide with the axis of rotation (FIG. 7).

If material is to be removed only at certain points of a workpiece, the beam may be pulsed in accordance with the speed of rotation, When the beam is controlled in this manner, so that it is switched on and off with a frequency corresponding to the speed of rotation, which can be easily achieved with conventional means, the material can be removed in a large number of different forms as regards azimuth position and depth.

FORCES PRODUCED MAGNETICALLY

It is possible to generate electric currents, in the impact area of the beam, which in conjunction with outer magnetic fields have a specific, additional effect on the material in the working zone, When currents and magnetic fields are generated separately, they may be of constant or variable duration. If the currents are generated in the workpiece by induction with the aid of the outer magnetic field, the optimum frequency for the desired effect will be chosen, which depends on the well-known relationships between workpiece configuration, material properties and disposition of the outer magnetic field.

WELDING APPLICATIONS

To prevent the molten material from overflowing or occasionally being flung out of the working zone, one coil 17 and 18 each may be arranged above and below the weld as shown in FIG. 8 so that an alternating current of appropriate frequency and identical phase flows in both coils in the same direction. An opposite current is then induced in the working zone, the magnetic field of which reciprocates with the primary field and pushes the melt towards the central plane MM, thus exerting a pressure which counteracts the overflow of the melt at the top or bottom.

CUTTING-OFF APPLICATIONS

If one (e.g. the lower) coil is omitted in the setup shown in FIG. 8, only a downward action of force remains, which causes or intensifies the flinging-out of molten material in this direction, so that a hole can be obtained or, if the workpiece is displaced laterally, a cut made.

The examples mentioned are intended to illustrate only some of the possibilities of realizing the basic idea of the invention.

What is claimed is:

1. A method for welding workpieces along a seam by means of a beam of radiant energy, comprising directing a beam of radiant energy at the workpieces adjacent the seam to fuse localized portions of the workpieces along the seam, subjecting the beam facing and opposite sides of the workpiece material in the range of the beam-fused portion to a magnetic field which is not sufficient to deflect the beam appreciably, passing an electric current from an alternate source of supply which is separate from the current produced by the beam through the workpieces in the vinicity of the beam-fused portion, said magnetic field and electric current having relative directions and magnitudes selected to apply a force of a desired direction and of corresponding magnitude on said fused material so as to compress previously melted material back into the weld seam, the possible directions of said force including the directions defined by the beam.

2. The method as recited in claim 1 wherein said magnetic field is alternating and said electric current is applied in synchronization with the magnetic field.

3. The method as recited in claim 1 in which the electric current is electromagnetically induced by the magnetic field.

References Cited

UNITED STATES PATENTS

| | | | |
|---|---|---|---|
| 1,389,476 | 8/1921 | Churchward | 219—128 |
| 1,535,586 | 4/1925 | Eschholz | 219—128 |
| 1,684,169 | 9/1928 | Brueckner et al. | 219—128 |
| 2,237,716 | 4/1941 | Spaulding | 219—128 |
| 3,080,626 | 3/1963 | Hanks | 219—121 |
| 3,112,850 | 12/1963 | Garibotti | 219—117 |
| 3,152,238 | 10/1964 | Anderson | 219—121 |
| 3,259,730 | 7/1966 | Wehde et al. | 219—121 |
| 3,259,969 | 7/1966 | Tessmann | 219—128 |
| 3,334,213 | 8/1967 | Sauve et al. | 219—154 |
| 3,351,731 | 11/1967 | Tanaka | 219—121 |
| 434,530 | 8/1890 | Thomson | 219—128 |
| 2,152,194 | 3/1939 | Jones | 219—123 |
| 2,920,183 | 1/1960 | Greene | 219—123 |
| 2,987,610 | 6/1961 | Steigerwald | 219—121 |
| 3,015,018 | 12/1961 | Rudd | 219—59 |
| 3,230,339 | 1/1966 | Opitz et al. | 219—121 |
| 3,234,353 | 2/1966 | Inoue | 219—123 |
| 3,268,648 | 8/1966 | Dietrich | 219—121 |
| 3,398,237 | 8/1968 | Paidosh | 219—121 |

FOREIGN PATENTS 721,969  1/1955  Great Britain.

JOSEPH V. TRUHE, Primary Examiner

W. DEXTER BROOKS, Assistant Examiner

U.S. Cl. X.R.

219—69